United States Patent
Knepper et al.

(10) Patent No.: US 9,880,800 B1
(45) Date of Patent: Jan. 30, 2018

(54) ROUTING CONTENT IN A DUAL-DISPLAY COMPUTING DEVICE

(71) Applicant: Dell Products L. P., Round Rock, TX (US)

(72) Inventors: Lawrence E. Knepper, Round Rock, TX (US); Jace W. Files, Round Rock, TX (US); Gerald R. Pelissier, Mendham, NJ (US)

(73) Assignee: Dell Products L. P., Round Rock, TX (US)

( * ) Notice: Subject to any disclaimer, the term of this patent is extended or adjusted under 35 U.S.C. 154(b) by 0 days.

(21) Appl. No.: 15/334,503

(22) Filed: Oct. 26, 2016

(51) Int. Cl.
| | |
|---|---|
| G09G 5/00 | (2006.01) |
| G06F 3/14 | (2006.01) |
| G09G 5/14 | (2006.01) |
| G06F 3/0482 | (2013.01) |
| G06F 1/16 | (2006.01) |
| G06T 3/60 | (2006.01) |
| G06F 21/84 | (2013.01) |
| G06F 3/0484 | (2013.01) |

(52) U.S. Cl.
CPC .......... *G06F 3/1446* (2013.01); *G06F 1/1616* (2013.01); *G06F 1/1641* (2013.01); *G06F 1/1694* (2013.01); *G06F 3/0482* (2013.01); *G06F 21/84* (2013.01); *G06T 3/60* (2013.01); *G09G 5/14* (2013.01); *G06F 3/04842* (2013.01); *G06F 2200/1614* (2013.01)

(58) Field of Classification Search
None
See application file for complete search history.

(56) References Cited

U.S. PATENT DOCUMENTS

| | | | |
|---|---|---|---|
| 7,567,239 B2 | 7/2009 | Seni | 345/173 |
| 8,108,016 B2 * | 1/2012 | Gaddy | H04M 1/0247 16/223 |
| 8,749,484 B2 * | 6/2014 | de Paz | G06F 1/1616 345/156 |
| 8,801,196 B2 | 8/2014 | Sawada et al. | 353/94 |
| 8,872,731 B2 * | 10/2014 | Gimpl | G06F 1/1616 345/1.3 |

(Continued)

OTHER PUBLICATIONS

Files, Jace W. et al., "Auto-Scrolling Input in a Dual-Display Computing Device"; U.S. Appl. No. 15/348,119, filed Nov. 10, 2016; consisting of Specification, Claims, Abstract, and Drawings (45 pages).

(Continued)

*Primary Examiner* — Barry Drennan
*Assistant Examiner* — Jason Pringle-Parker
(74) *Attorney, Agent, or Firm* — Campbell Stephenson LLP; Shiv S. Naimpally

(57) ABSTRACT

In some implementations a computing device may comprise at least a first display device and a second display device. The computing device may receive a selection to display protected content. The computing device may determine a display mode associated with the first display device and the second display device. The computing device may determine an orientation (e.g., landscape or portrait) and modify (e.g., by rotating) the content based on the orientation to create modified content. The computing device may determine a routing of the modified content and route the modified content to at least one of the first display device or the second display device.

20 Claims, 10 Drawing Sheets

(56) References Cited

U.S. PATENT DOCUMENTS

| | | | |
|---|---|---|---|
| 8,963,857 B2 | 2/2015 | Kim et al. | 345/173 |
| 9,013,368 B1 * | 4/2015 | Kim | G06F 3/1446 |
| | | | 345/1.1 |
| 9,250,851 B2 * | 2/2016 | Lu | G06F 3/1446 |
| 9,348,497 B2 | 5/2016 | Miyano | 345/173 |
| 2008/0129712 A1 | 6/2008 | Nguyen | 345/179 |
| 2009/0262079 A1 * | 10/2009 | Bury | G06F 1/162 |
| | | | 345/169 |
| 2012/0081400 A1 * | 4/2012 | Schrock | G06F 1/1616 |
| | | | 345/649 |
| 2012/0280924 A1 * | 11/2012 | Kummer | G06F 1/1641 |
| | | | 345/173 |
| 2013/0328878 A1 * | 12/2013 | Stahl | G06F 3/1431 |
| | | | 345/428 |
| 2013/0332642 A1 * | 12/2013 | Capezza | G06F 13/4081 |
| | | | 710/304 |
| 2014/0092107 A1 * | 4/2014 | Ferry | G06T 1/20 |
| | | | 345/520 |
| 2015/0067489 A1 | 3/2015 | Zotto et al. | 715/268 |
| 2016/0182924 A1 * | 6/2016 | Todd | H04N 21/2343 |
| | | | 725/116 |
| 2016/0274722 A1 * | 9/2016 | Putzolu | G06F 1/1616 |
| 2016/0321969 A1 * | 11/2016 | Kambhatla | G09G 3/003 |

OTHER PUBLICATIONS

Siebert, Philip M., et al., "Automatically Modifying an Input Area Based on a Proximity to Oneo More Edges"; U.S. Appl. No. 15/352,826, filed Nov. 16, 2016; consisting of Specification, Claims, Abstract, and Drawings (38 pages).

Files, Jace W. et al., "Backlight Compensation for a Computing Device with Two or More Display Devices"; U.S. Appl. No. 15/364,529, filed Nov. 30, 2016; consisting of Specification, Claims, Abstract, and Drawings (43 pages).

* cited by examiner

ROUTING CONTENT IN A DUAL-DISPLAY COMPUTING DEVICE

BACKGROUND OF THE INVENTION

Field of the Invention

This invention relates generally to dual-display devices and, more particularly, to using a crossbar switch to select one of multiple dual-display modes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

All-in-one computing devices are computing devices that include both a graphics-processing unit (GPU) and a display device. Tablets and laptops are typically all-in-one devices, and some desktop devices are designed as all-in-one devices. The GPU may be part of a central processing unit (CPU) or may be a separate device from the CPU. Current graphics processing units (GPUs) and operating systems (OS) (e.g., Microsoft® Windows®) are pre-configured to drive a single, internal display device using an embedded DisplayPort (eDP) port. For this reason, content displayed on the internal display device is automatically rotated while content displayed on an additional display device (e.g., considered by the GPU and operating system as an external display device) is not automatically rotated. The eDP port is designed to (a) output media content without digital rights management (DRM) (e.g., High-bandwidth Digital Content Protection (HDCP)) when outputting protected content to an embedded display (e.g., an internal display) and (b) encrypt content using DRM (e.g., HDCP) before outputting to the additional display.

However, the presumption by the GPU and OS that the computing device has a single internal display device can cause problems when an all-in-one computing device has two (or more) display devices which are both internal to (e.g., incorporated into) the computing device. For example, if a computing device includes two display devices, an eDP port may drive the first display (internal display) device while a DisplayPort (DP) port may drive a second display (additional or external display) device. In this example, protected content may be displayed on the first display device but not on the second display device because the second display device does not have the circuitry to decrypt encrypted (e.g., HDCP) content, even though the second display device is an embedded display device that does not expect to receive encrypted content. Therefore, an all-in-one computing device that has two (or more) display devices may have problems (1) playing DRM protected media content and (2) changing the orientation of content being sent to each of the display devices.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations a computing device may comprise at least a first display device and a second display device. The computing device may receive a selection to display protected content. The computing device may determine a display mode associated with the first display device and the second display device. The computing device may determine an orientation (e.g., landscape or portrait) and modify (e.g., rotate between approximately 0 degrees to approximately 360 degrees) the content based on the orientation to create modified content. The computing device may determine a routing of the modified content and route the modified content to at least one of the first display device or the second display device.

BRIEF DESCRIPTION OF THE DRAWINGS

A more complete understanding of the present disclosure may be obtained by reference to the following Detailed Description when taken in conjunction with the accompanying Drawings. In the FIG.s, the left-most digit(s) of a reference number identifies the FIG. in which the reference number first appears. The same reference numbers in different FIG.s indicate similar or identical items.

DETAILED DESCRIPTION

Figure 1:
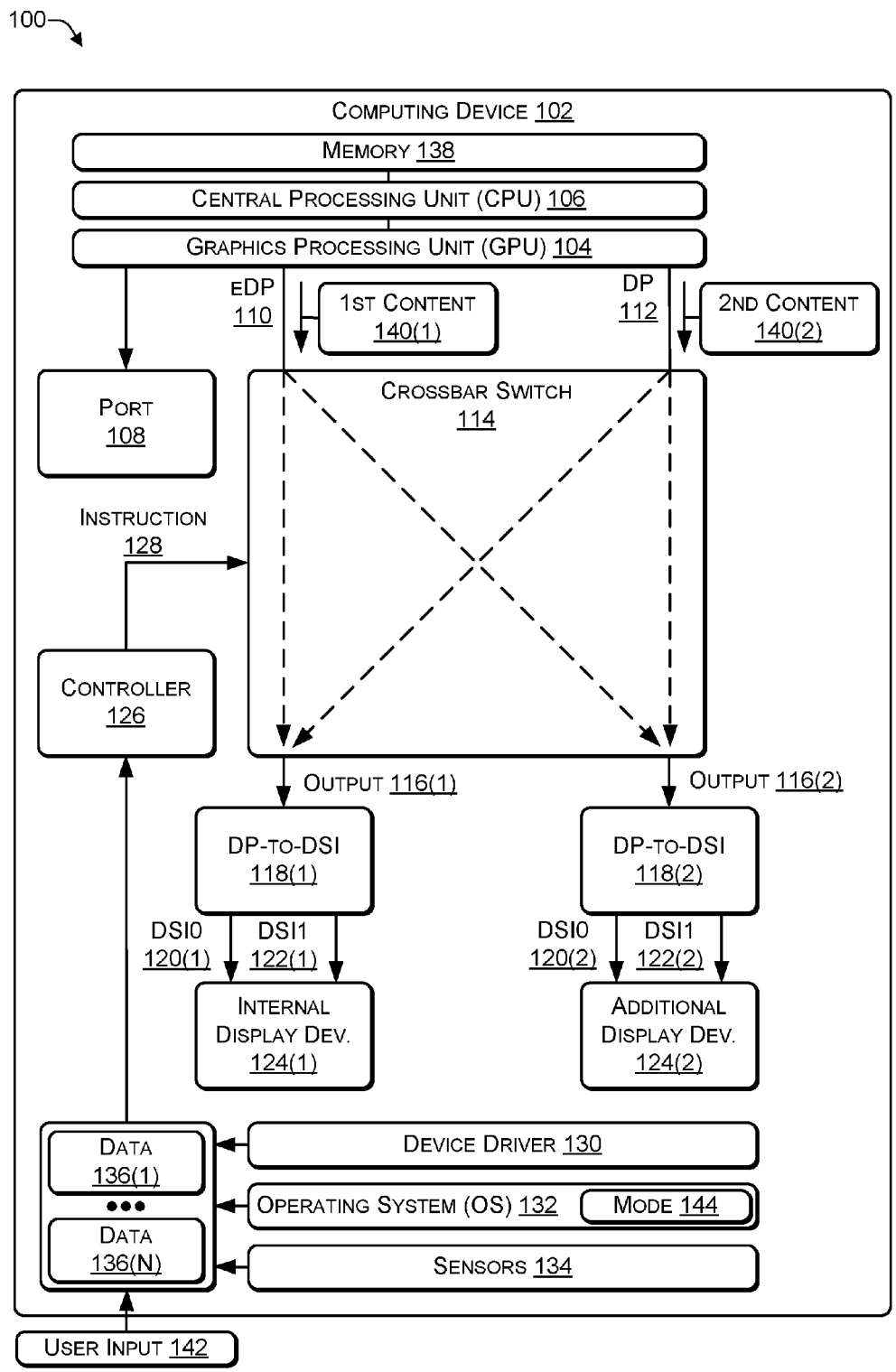
FIG. 1 is a block diagram of an architecture of a computing device that includes a crossbar switch according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a crossbar switch to enable the output from either an embedded DisplayPort (eDP) port and one or more DisplayPort (DP) port to be routed to two or more display devices. While the examples herein use a computing device with two display devices, the systems and techniques may also be extrapolated for use with computing devices having more than two display device. The crossbar switch may be used to route the content from an eDP port and a DP port to (1) a first (e.g., internal) display, (2) a second (e.g., additional) display or (3) both the first display and the second display of an all-in-one computing device that includes two display devices. For example, data from sensors, such as an accelerometer, a gyroscope, a magnetometer or a magnetic compass, a proximity sensor, a camera, or other types of sensors included in the computing device may be provided to a graphic processing unit (GPU). The GPU may adjust the orientation (e.g., landscape or portrait) and position (e.g., top/bottom or left/right) of the content being sent to the two displays based on the data. Without the crossbar switch, a user of the computing device would be tasked with (i) knowing which display device the computing device considered to be the internal (e.g., primary or embedded) display device and (ii) manually orienting the displays accordingly. By using the crossbar switch, as the orientation and position of the first display and the second display changes, the computing device is able to automatically re-route the content being displayed based on the orientation.

In a computing device with two display devices, the crossbar switch may be used to select one of four possible routings: (1) normal, (2) swap, (3) eDP only, or (4) DP only. The normal routing sends the output of the eDP port to the internal display device and sends the output of the DP port to the additional display device (e.g., considered an external display device by the GPU and OS). The swap routing sends the output of the DP port to the internal display device and sends the output of the eDP port to the additional display device. The eDP only routing sends the eDP port output to both display devices. The DP only routing sends the DP port output to both display devices.

When protected content is output from the eDP port, the protected content is output in an unencrypted format (e.g., without any protection) because the output of the eDP port is intended for an internal display device. The output of the eDP port can be displayed in full high definition (FHD) resolution (at least 1280×720 pixels) on the internal display. If the protected content is output from the DP port, the DP port is designed to assume that the output is being sent to an external display that supports DRM (e.g., HDCP). Therefore, DRM protected content is output from the DP port in an encrypted format, such as encrypted using HDCP. If the additional display device connected to the DP port does not support HDCP, as is the case in an all-in-one computing device with two display devices, then the protected content may not display in FHD mode. Instead, the encrypted content (i) may be displayed in standard definition (e.g., a resolution of less than 1280×720 pixels) or (ii) may not be displayed. The crossbar switch enables the unencrypted content that is output from the eDP port to be routed to the additional display device (instead of to the internal display device) based on the orientation and position of each of the two display devices. The crossbar switch thus enables a user (i) to use a computing device that includes two display devices in any orientation and (ii) to display protected content in FHD without having paying attention to which display device is the "primary" (e.g., internal) display device and which is the "secondary" (e.g., additional) display device.

Thus, a portable all-in-one computing device may include two display devices. An embedded controller may receive data from one or more sensors in the computing device and determine an orientation and position of at least one of the display devices. The embedded controller may modify content being sent to one or both of the display devices. In some cases, the content may be protected using a DRM scheme, such as HDCP. The content may be modified by rotating the content between approximately 0 degrees and approximately 360 degrees. For example, in some cases, the content may be rotated to the right or to the left and by 90 degrees, 180 degrees, or 270 degrees. The embedded controller may route the content being sent to one or both of the display devices based on the data received from the sensors and based on whether the additional display is configured as an extension or a clone of the internal display. In this way, a user can pick up the computing device and use it in different configurations and the embedded controller automatically (e.g., without human interaction) modifies and routes the content to one or both of the displays.

FIG. 1 is a block diagram of an architecture 100 of a computing device that includes a crossbar switch according to some embodiments. The computing device 102 includes a graphics processing unit 104. The graphics processing unit 104 may be an independent device (e.g., integrated circuit) or may be part of a central processing unit 106. The GPU 104 may provide three video data outputs (e.g., three pipes). For example, a third video data output of the GPU 104 may be sent to a port 108. The port 108 may be used to connect an external display device to the computing device 102. In some implementations, the third video data output of the GPU 104 may be sent to a third display device of the computing device 102 (e.g., instead of to the port 108). The GPU 104 may provide a second video data output from an embedded DisplayPort (eDP) port 110. The GPU 104 may provide a third video data output from a DisplayPort (DP) port 112. First content 140(1) from the eDP 110 and second content 140(2) from the DP 112 may be sent to a crossbar switch 114. The crossbar switch 114 may be capable of routing the content 140 from the eDP 110 and the output from the DP 112 to either (or both) output 116(1) or output 116(2). The outputs 116 from the crossbar switch 114 may be sent to a DP-to-DSI converter 118. The DP-to-DSI converter 118 may convert a DisplayPort compliant signal into a display serial interface (DSI) compliant signal. For example, the DP-to-DSI 118(1) may provide two DSI lanes DSI0 120(1) and DSI1 122(1) to an internal display device 124(1). The internal display device 124(1) is a display device that is typically (e.g., in a computing device with a single display) connected to the eDP port 110. The DP-to-DSI 118(2) may receive the output 116(2) from the crossbar switch 114 and provide two DSI lanes DSI0 120(2) and DSI1 122(2) to the additional display device 124(2).

A controller 126 (e.g., an embedded controller) may receive data 136(1) to data 136(N) (where N>0) from one or more of (i) a device driver 130 (e.g., associated with GPU 104), (ii) an operating system 132 of the computing device 102, (iii) one or more sensors 134 associated with the computing device 102, or (iv) user input 142 provided by a user of the computing device 102. For example, the sensors 134 may include an accelerometer, a gyroscope, a magnetometer or a magnetic compass, a proximity sensor, a camera, another type of sensor, or any combination thereof. A user of the computing device 102 may provide the user input 142. In some cases, the user input 142 may override the data from one or more of the device driver 130, the operating system 132, or the sensors 134. For example, the controller 126 may use the data from one or more of the device driver 130, the operating system 132, or the sensors 134 to determine a particular routing and instruct the crossbar switch 114 to configure a particular routing. In some cases, the user may override the particular routing by providing the user input 142.

The computing device 102 may include a memory 138. The memory 138 may be used to store content, such as the first content 140(1) and the second content 140(2). At least one of the first content 140(1) or the second content 140(2) may include unprotected content or protected content (e.g., content protected using a DRM scheme).

The controller 126 may, based on the data 136, provide an instruction 128 to the crossbar switch 114 to select a routing that routes one or more of the first content 140(1) (from the eDP port 110) or the second content 140(2) (from the DP port 112) to one or more of the outputs 116(1) or 116(2). For example, the crossbar switch 114 may route the first content 140(1) from the eDP port 110 to the output 116(1) for display on the internal display device 124(1) and may route the second content 140(2) from the DP port 112 to the output 116(2) for display on the additional display device 124(2). As a second example, the crossbar switch 114 may route the first content 140(1) from the eDP port 110 to the output 116(2) for display on the additional display device 124(2) and may route the second content 140(2) from the DP port 112 to the output 116(1) for display on the internal display device 124(2). As a third example, the crossbar switch 114 may route the first content 140(1) from the eDP port 110 to both the output 116(1) and 116(2) for display on the internal display device 124(1) and the additional display device 124(2). As a fourth example, the crossbar switch 114 may route the second content 140(2) from the DP port 112 to both the output 116(1) and the output 116(2) for display on the internal display device 124(1) and the additional display device 124(2).

The controller 126 may determine which routing of the crossbar switch 114 to select based on (1) an orientation of the computing device 102, (2) a display mode 144 of the operating system 132, and (3) whether DRM-protected content is being displayed. The orientation of the computing device 102 may be determined based on which of the display devices 124(1) or 124(2) is "up" (when the computing device 102 is in a horizontal orientation) or which of the display devices 124(1) or 124(2) is "left" (when the computing device 102 is in a vertical orientation). For example, the operating system 132, such as Microsoft® Windows®, may provide three display modes 144: (a) extended desktop mode where the display devices 124(1) and 124(2) behave as if they were a single display device, (b) clone mode where each of the display devices 124(1) and 124(2) display the same content, or (c) single display mode, e.g., one of the display devices 124(1) or 124(2) is off and therefore not displaying any content. For example, single display mode may be used when the computing device is in a tablet orientation to turn off a particular display device (of the display devices 124(1) and 124(2)) that is not visible to (or facing) the user.

The operating system (OS) 132 may allow DRM protected content to be displayed on a single display device (e.g., either 124(1) or 124(2)) and prevent DRM protected content from being displayed across both of the displays in extended desktop mode (because in extended desktop mode, one of the display devices 124(1) or 124(2) is to be driven by output from the DP port 112). Therefore, DRM protected content may be displayed on only one of the display devices 124(1) or 124(2) in the extended desktop mode. Thus, in all three of the modes 144 (e.g., extended desktop mode, clone mode, or single display mode), the DRM protected content may be displayed on either the internal display device 124(1) or the additional display device 124(2) depending on which of the display devices 124(1) and 124(2) is visible to the user (e.g., based on the orientation of the computing device 102).

Typically, when viewing DRM protected content such as a movie or television show, the computing device may be in a horizontal (e.g., landscape) orientation. In any of the three display modes, if the internal display device 124(1) is "up" in the horizontal orientation, then the first content 140(1) from the eDP port 110 may be sent to the output 116(1) for display on the internal display device 124(1). In any of the three display modes, if the additional display device 124(2) is "up" in the horizontal orientation, then the first content 140(1) from the eDP port 110 may be sent to the output 116(2) for display on the additional display device 124(2). In the horizontal mode, in the extended desktop mode, other applications or other content may be displayed by the display device that is "down". In the horizontal mode, in the clone mode, the DRM protected content may be displayed on both the display device that is "up" and the display device that is "down" (e.g., the content is duplicated on each of the two display devices). In the horizontal mode, in the single display mode, the DRM protected content may be displayed on the display device that is "up" while no content may be displayed on the display device that is "down".

In a tablet orientation (see FIGS. 3 and 4 for more details), in which the display device 124(1) is facing in an opposite direction from the display device 124(2), the controller 126 may determine that a particular display device of the display devices 124(1) or 124(2) is visible to the user based on the data 136 (including data from the user input 142). The controller 126 may send the instruction 128 to the crossbar switch 114 to select a routing that sends the first content 140(1) from the eDP port 110 to the particular display device that is visible to the user. By routing the output of the eDP port 110 to whichever of the display devices 124(1) or 124(2) is visible to the user, the display device is able to re-orient the content when the computing device 102 is rotated. In addition, DRM protected content may be displayed in FHD by sending the output of the eDP port 110, regardless of which of the display devices 124(1) or 124(2) is "up". In the tablet orientation, the output of the eDP port 110 may be sent to the internal display device 124(1) when the internal display device 124(1) is visible to the user and may be sent to the additional display device 124(2) when the additional display device 124(2) is visible to the user. The display device that is not visible to the user may either (i) be off (e.g., in the single display mode) or (ii) display the same content being displayed on the other display device (e.g., clone mode).

In a clamshell mode (see FIG. 4 for more details) in which one of the display devices 124 is at the top and the other is at the bottom, the controller 126 may identify which of the display devices 124 is at the top based on the data 136 received from one or more of the device driver 130, the OS 132, the sensors 134, and the user input 142. In the clamshell mode, if the operating system 132 is in the extended display mode, then if the internal display device 124(1) is on top, the output of the eDP port 110 is routed to the internal display device 124(1) and the output of the DP port 112 is routed to the additional display device 124(2). If the additional display device 124(2) is on top, the output of the eDP port 110 is routed to the additional display device 124(2) and the output of the DP port 112 is routed to the internal display device 124(1). In the clamshell mode, if the operating system 132 is in the clone mode, then the output of the eDP port 110 is routed to both the internal display device 124(1) and to the additional display device 124(2). As previously discussed, DRM protected content is displayed on the display device(s) to which the output of the eDP port 110 is routed (e.g., to the display device that is determined to be at the top in single display mode or to both display devices in clone mode). DRM protected content may not be displayed in FHD resolution in extended display mode because the output of the DP port 112 is encrypted and both the internal display device 124(1) and the additional display device 124(2) lack the circuitry to decrypt and display content in FHD resolution. If DRM protected content is played back while the OS 132 is in the extended desktop mode, the DRM protected content may be shown in standard definition (SD) resolution or may not be displayed at all, depending on the type of content and the DRM constraints.

In the extended desktop mode, DRM protected content may be displayed by routing the content from the eDP port 110 to one of the display devices 124(1) or 124(2). For example, playing a movie in "full screen" expands the movie to fill the particular display device that is connected to the eDP port 110. The OS 132 may, based on the DRM protection, prevent the movie from being displayed stretched across both the display devices 124(1) and 124(2). Clone mode does not violate the DRM protection because the first content 140(1) is sent from the eDP port 110 and duplicated on both of the display devices 124(1) and 124(2). In the extended desktop mode, unprotected content may be displayed stretched across both of the display devices 124(1) and 124(2) by sending half of the unprotected content from the eDP port 110 and a remaining half of the unprotected content from the DP port 112.

The GPU 104 may support three logical pipes (e.g., three video outputs). An advantage of using the crossbar switch 114 to drive both of the display devices 124(1) and 124(2) is that a single output port (e.g., the eDP port 110 or the DP port 112) of the GPU 104 is used. For example, by using a single logical pipe (e.g., a single output port) to drive both of the display devices 124(1) and 124(2) in clone mode for protected/unprotected content or in extended desktop mode for unprotected content, the two remaining logical pipes may be used to drive one or two external displays (e.g., via the port 108). In clone mode, if the crossbar switch 114 was not present, then the GPU 104 would use two logical pipes (e.g., the eDP port 110 and the DP port 112) to send the content to both the display devices 124(1) and 124(2), thereby leaving a single pipe to drive an external display (e.g., via the port 108). In some implementations, the computing device 102 may include a third display device, with each of the three logical pipes of the GPU 104 capable of driving each of the three display devices.

Table 1 summarizes the various possible routings and which port(s) are used based on (i) whether DRM content is being played back and (ii) the display mode 144 of the operating system 132 has been selected. If the content does not have DRM protection in either single display mode or clone mode, then either of the eDP port 110 or the DP port 112 may be used. Though Table 1 does not include an entry, in some implementations, unprotected content may be routed from the DP port 112 to either of the display devices 124(1) or 124(2) in single display mode or to both of the display devices 124(1) and 124(2) in clone mode. Because there is no advantage to using the DP port 112 for unprotected content in single display mode or clone mode and because the normal routing uses the output of the eDP port 110, if content does not have DRM protection in clone mode (or single display mode), then the output of the eDP port 110 is routed both (or one) of the display devices 124(1) and 124(2).

As the examples in Table 1 illustrate, in the extended desktop mode, DRM protected content is output in an unencrypted format from the eDP port 110 and sent to either the internal display device 124(1) or the additional display device 124(2) while unprotected content is output from the DP port 112 and sent to the other display device. For example, if the output of the eDP port 110 is sent to the internal display device 124(1) then the output of the DP port 112 is sent to the additional display device 124(2). If the output of the eDP port 110 is sent to the additional display device 124(2) then the output of the eDP port 110 is sent to the internal display device 124(1).

TABLE 1

| DRM | OS Display Mode | Routing | eDP Port Output | DP Port Output |
|---|---|---|---|---|
| Yes | Single Display Mode | eDP Only | Either Internal or Additional Display | Not Used |
| Yes | Clone Mode | eDP Only | Both Displays | Not Used |

TABLE 1-continued

| DRM | OS Display Mode | Routing | eDP Port Output | DP Port Output |
|---|---|---|---|---|
| Yes | Extended Desktop Mode | Normal or Swap | One of the two displays | The other of the two displays |
| No | Single Display Mode | eDP Only | Either Internal or Additional Display | Not Used |
| No | Clone Mode | eDP Only or DP Only | Both Display Devices or Not Used | Both Display Devices or Not Used |
| No | Extended Desktop Mode | Normal or Swap | Internal or Additional Display Device | Internal or Additional Display Device |

Thus, the controller 126 may receive the data 136(1) to 136(N) from one or more of the device driver 130, the operating system 132, or the sensors 134. The controller 126 may determine an orientation of the computing device 102 based on the data 136. Based on the orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). Based on (a) the display mode 144 (e.g., single mode, clone mode, or extended desktop mode) of the OS 132, and (b) whether the content being displayed is protected using DRM, the controller 126 may select a routing and send the instruction 128 to the crossbar switch 114 selecting the routing. The instruction 128 may cause the crossbar switch 114 to be configured to perform the selected routing. In some cases, a user may provide the user input 142 to modify (or override) the orientation determined by the controller 126, the routing determined by the controller 126, or both. If the orientation of the computing device 102 changes while the content is being displayed, the controller 126 may receive new data 136, determine a new orientation, determine a new routing, and automatically instruct the crossbar switch 114 to configure a new routing. Based on the new orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). In some cases, the user input 142 may cause the controller 126 to "lock" a particular routing configuration, a particular orientation, or both, such that the controller 126 ignores any additional data received from one or more of the device driver 130, the OS 132, or the sensors 134 until the user input 142 causes the controller 126 to remove the "lock".

Figure 2:
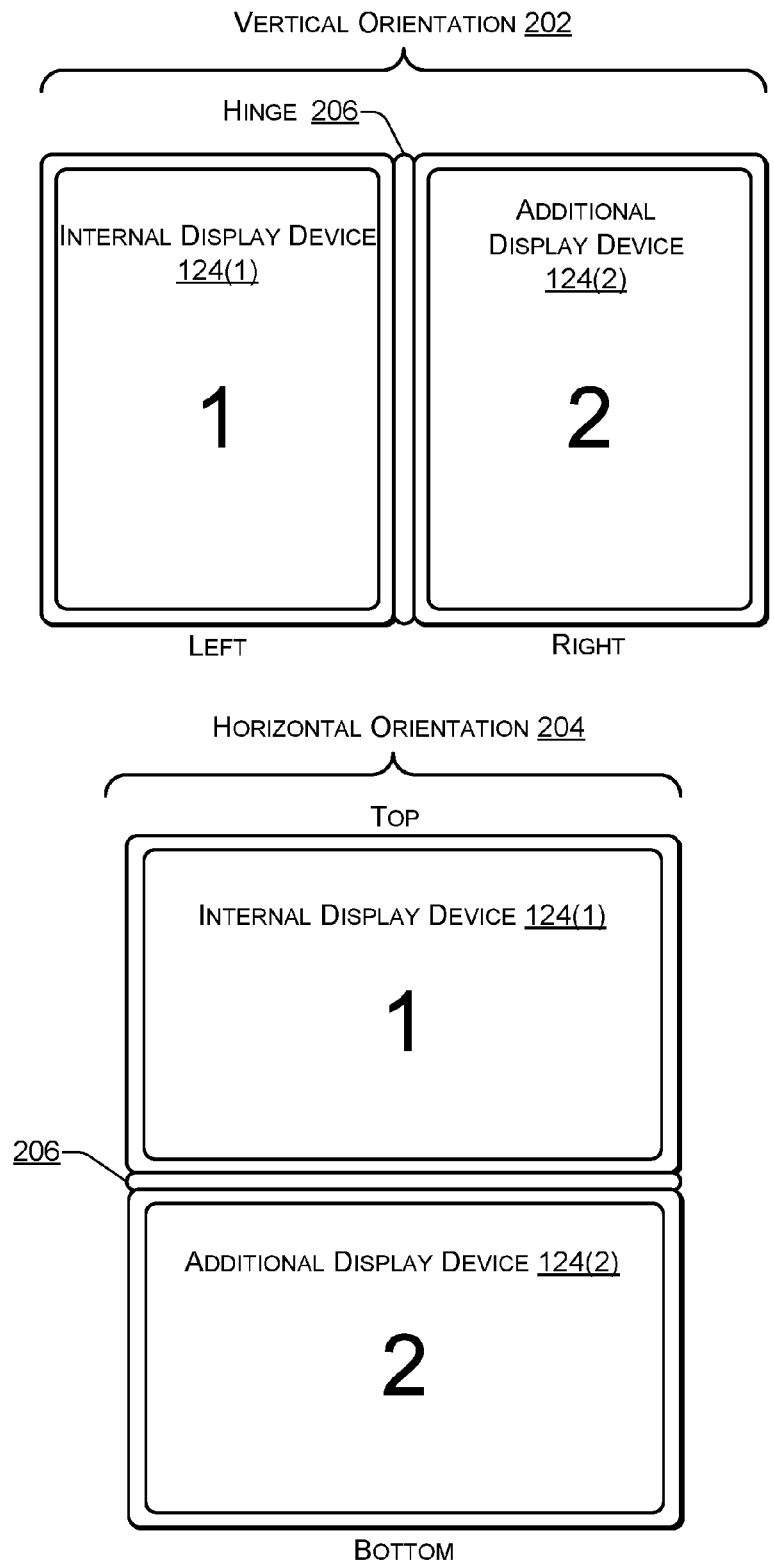
FIG. 2 is a block diagram illustrating different orientations of a dual-screen device according to some embodiments.
Figure 3:
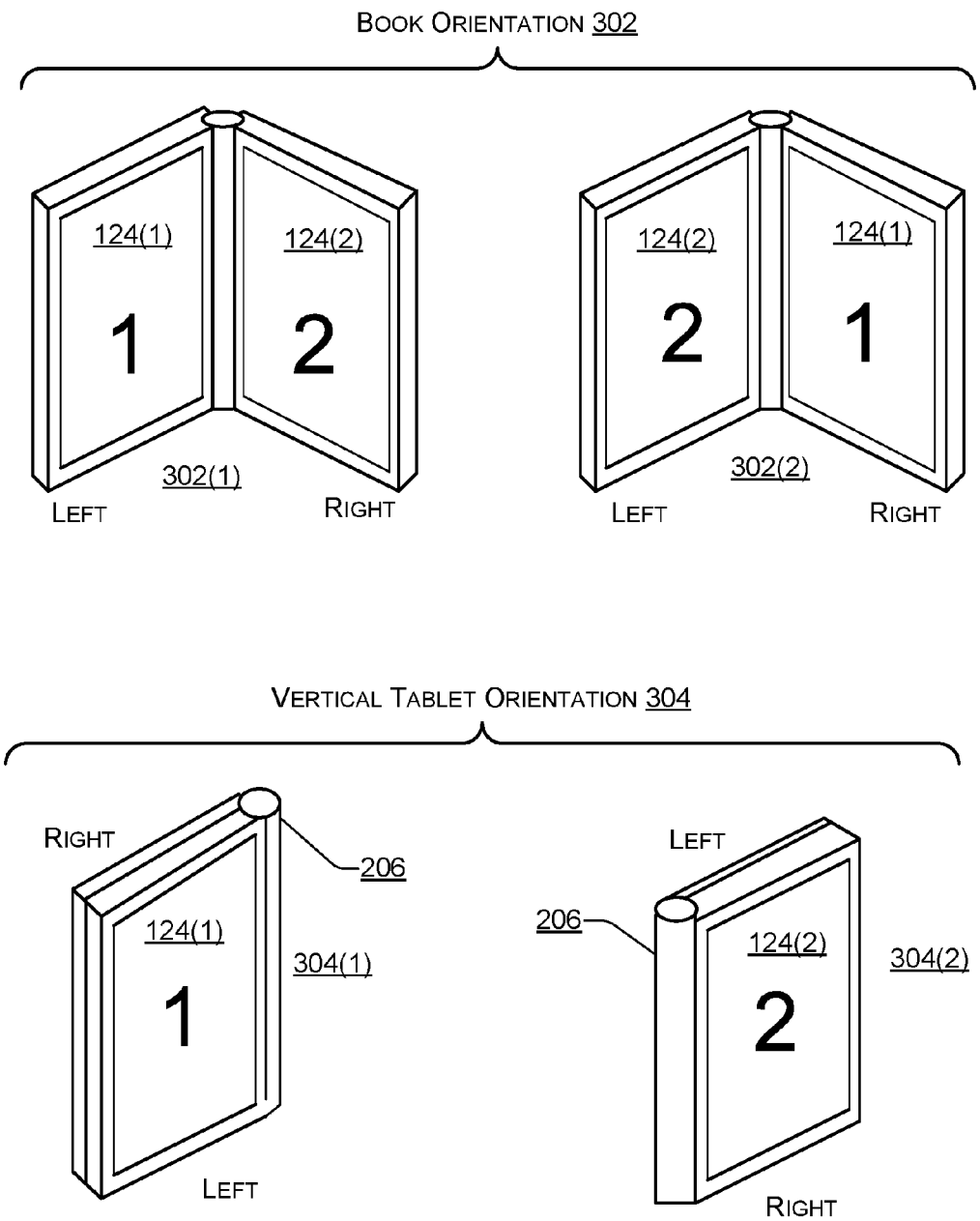
FIG. 3 is a block diagram illustrating modes of a dual-screen device in a vertical orientation according to some embodiments.

FIG. 2 is a block diagram 200 illustrating different orientations of a dual-screen device (e.g., the computing device 102 of FIG. 1) according to some embodiments. As previously noted in FIG. 1, the computing device 102 may include at least two display devices, the internal display device 124(1) and the additional display device 124(2). The computing device 102 may be displayed in a vertical (e.g., portrait) orientation 202 or a horizontal (e.g., landscape) orientation 204. For example, in the vertical orientation 202, the internal display device 124(1) may be on one side (e.g., the left side or the right side), the additional display device 124(2) may be on another side (e.g., the right side or the left side), and a hinge 206 may join the internal display device 124(1) to the additional display device 124(2). Additional examples of the vertical orientation 202 are illustrated in FIG. 3. In the horizontal orientation 204, the internal display device 124(1) may be located at the top (or the bottom) of the computing device 102 with the hinge 206 in the middle and the additional display device 124(2) at the bottom (or the top) of the computing device. Additional examples of the horizontal orientation 204 are illustrated in FIG. 4.

FIG. 3 is a block diagram 300 illustrating modes of a dual-screen device in a vertical orientation according to some embodiments. Examples of the vertical orientation 202 may include a book orientation 302 or a vertical tablet orientation 304. For example, in a first book orientation 302(1), the internal display device 124(1) may be on the left and the additional display device 124(2) may be on the right. Alternately, in a second book orientation 302(2), the additional display device 124(2) may be on the left and the internal display device 124(1) may be on the right.

In the vertical tablet orientation 304, the internal display device 124(1) may be on the left and the additional display device 124(2) may be on the right. In a first vertical tablet orientation 304(1), the internal display device 124(1) may be facing a user and the additional display device 124(2) may be rotated approximately 360 degrees to face away from the user. In a second vertical tablet orientation 304(2), the additional display device 124(2) may be facing the user while the internal display device 124(1) may rotated approximately 360 degrees to face away from the user.

Figure 4:
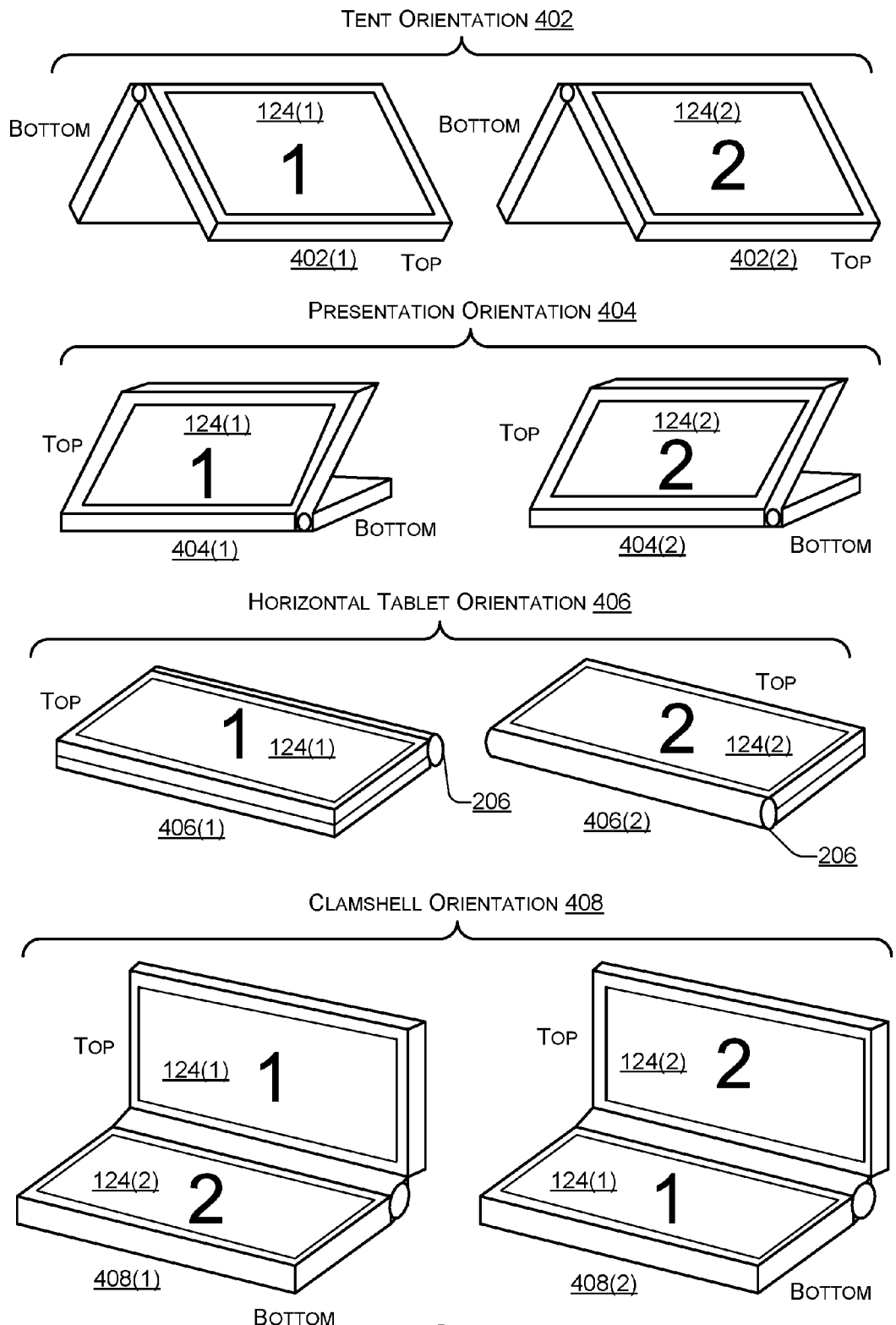
FIG. 4 is a block diagram illustrating modes of a dual-screen device in a horizontal orientation according to some embodiments.

FIG. 4 is a block diagram 400 illustrating modes of a dual-screen device in a horizontal orientation according to some embodiments. Examples of the horizontal orientation 204 may include a tent orientation 402, a presentation orientation 404, a horizontal tablet orientation 406, and a clamshell orientation 408.

In 402(1), the internal display device 124(1) may be at the top facing the user while the additional display device 124(2) may be at the bottom facing away from the user. In 402(2), the additional display device 124(2) may be at the top facing the user and the internal display device 124(1) may be at the bottom facing away from the user.

In 404(1), the internal display device 124(1) may be at the top facing the user and the additional display device 124(2) may be at the bottom facing down. In 404(2) the additional display device 124(2) may be at the top facing the user and the internal display device 124(1) may be at the bottom facing down.

In 406(1), the internal display device 124(1) may be at the top facing the user and the additional display device 124(2) may be at the bottom facing down (e.g., away from the user). In 406(2), the additional display device 124(2) may be at the top facing the user and the internal display device 124(1) may be at the bottom facing down (e.g., away from the user).

In 408(1), the internal display device 124(1) may be at the top facing the user and the additional display device 124(2) may be at the bottom facing the user (e.g., in a position where traditionally, a keyboard is located in a laptop). In 408(1), in some cases, a QWERTY-based keyboard may be displayed on the additional display device 124(2) and used to receive keyboard input. In 408(2), the additional display device 124(2) may be at the top facing the user and the internal display device 124(1) may be at the bottom facing the user (e.g., in a position where traditionally, a keyboard is located in a laptop). In 408(2), in some cases, a QWERTY-based keyboard may be displayed on the internal display device 124(1) and used to receive keyboard input.

Figure 5:
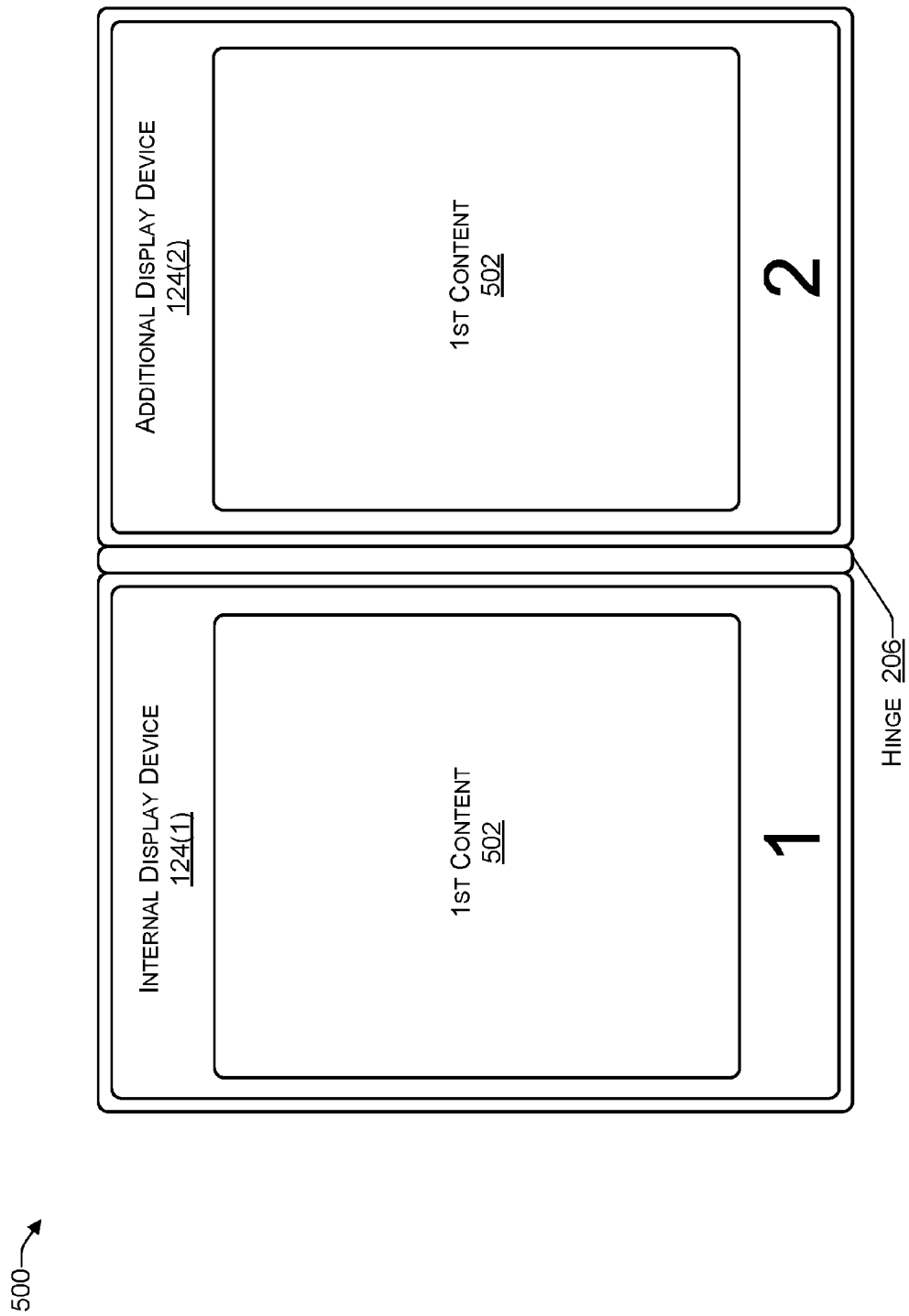
FIG. 5 is a block diagram illustrating a dual-screen device in which the operating system is in a clone mode according to some embodiments.

FIG. 5 is a block diagram 500 illustrating a dual-screen device in which the operating system is in a clone mode according to some embodiments. When the OS 132 is set to display content on the computing device 102 of FIG. 1 in the clone mode, first content 502 may be displayed on the internal display device 124(1) and also on the additional display device 124(2).

Figure 6:
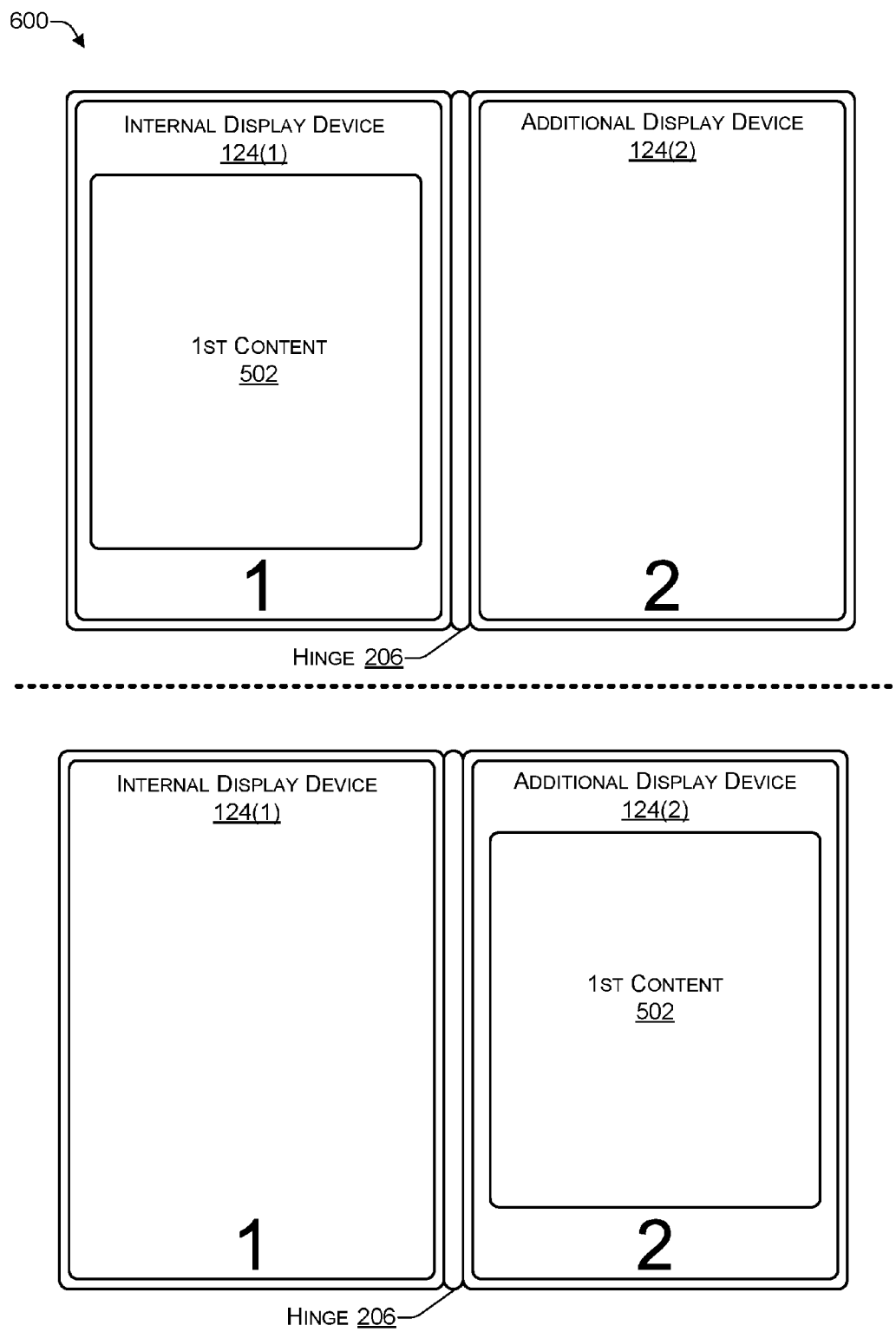
FIG. 6 is a block diagram illustrating a dual-screen device in which the operating system is in a single display mode according to some embodiments.

FIG. 6 is a block diagram 600 illustrating a dual-screen device in which the operating system is in a single display mode according to some embodiments. When the OS 132 is set to display content on the computing device 102 of FIG. 1 in the single display mode, the first content 502 may be displayed on either (but not both) of the internal display device 124(1) or the additional display device 124(2). For example, the first content 502 may be displayed on the internal display device 124(1) and the additional display device 124(2) may not display any content (e.g., blank or off), as illustrated in the top of FIG. 6, or the first content 502 may be displayed on the additional display device 124(2) and the internal display device 124(1) may not display any content (e.g., blank or off), as illustrated in the bottom of FIG. 6.

Figure 7:
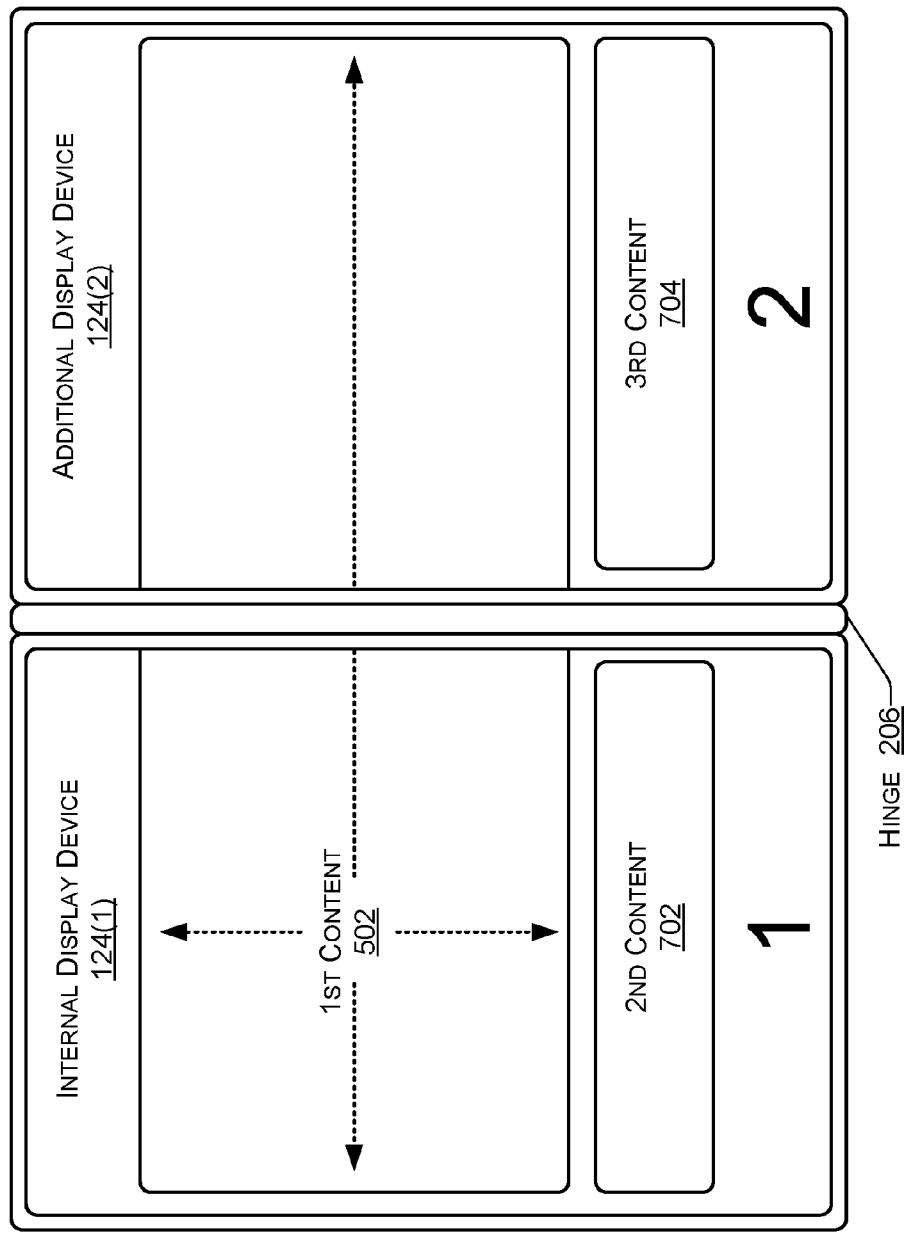
FIG. 7 is a block diagram illustrating a dual-screen device in which the operating system is in an extended display mode according to some embodiments.

FIG. 7 is a block diagram 700 illustrating a dual-screen device in which the operating system is in an extended display mode according to some embodiments. When the OS 132 is set to display content on the computing device 102 of FIG. 1 in the extended display mode, some content, such as the first content 502, may be displayed across both the internal display device 124(1) and the additional display device 124(2). In some cases, additional content may be displayed on either the internal display device 124(1) or the additional display device 124(2). For example, second content 702 may be displayed on the internal display device 124(1) and third content 704 may be displayed on the additional display device 124(2). Because the eDP port 110 is used to output DRM protected content, protected content may be displayed (e.g., due to the DRM restrictions) on one of the display devices 124(1) or 124(2) whereas unprotected content may be displayed on either or both of the display devices 124(1) or 124(2). For example, in FIG. 7, the first content 502 may be unprotected content while either the second content 702 or the third content 704 may be protected content.

Figure 8:
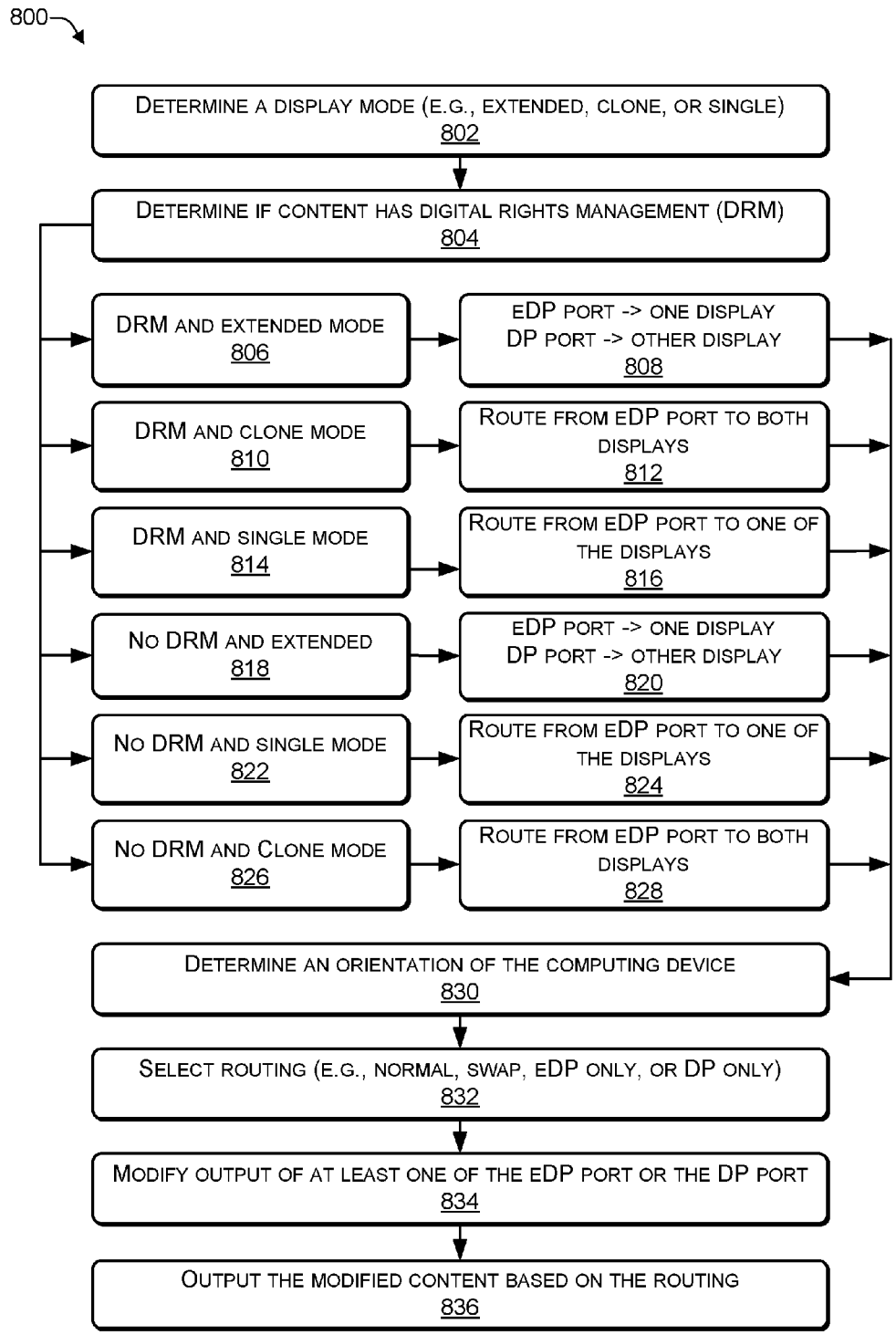
FIG. 8 is a flowchart of a process that includes determining a display mode according to some embodiments.
Figure 9:
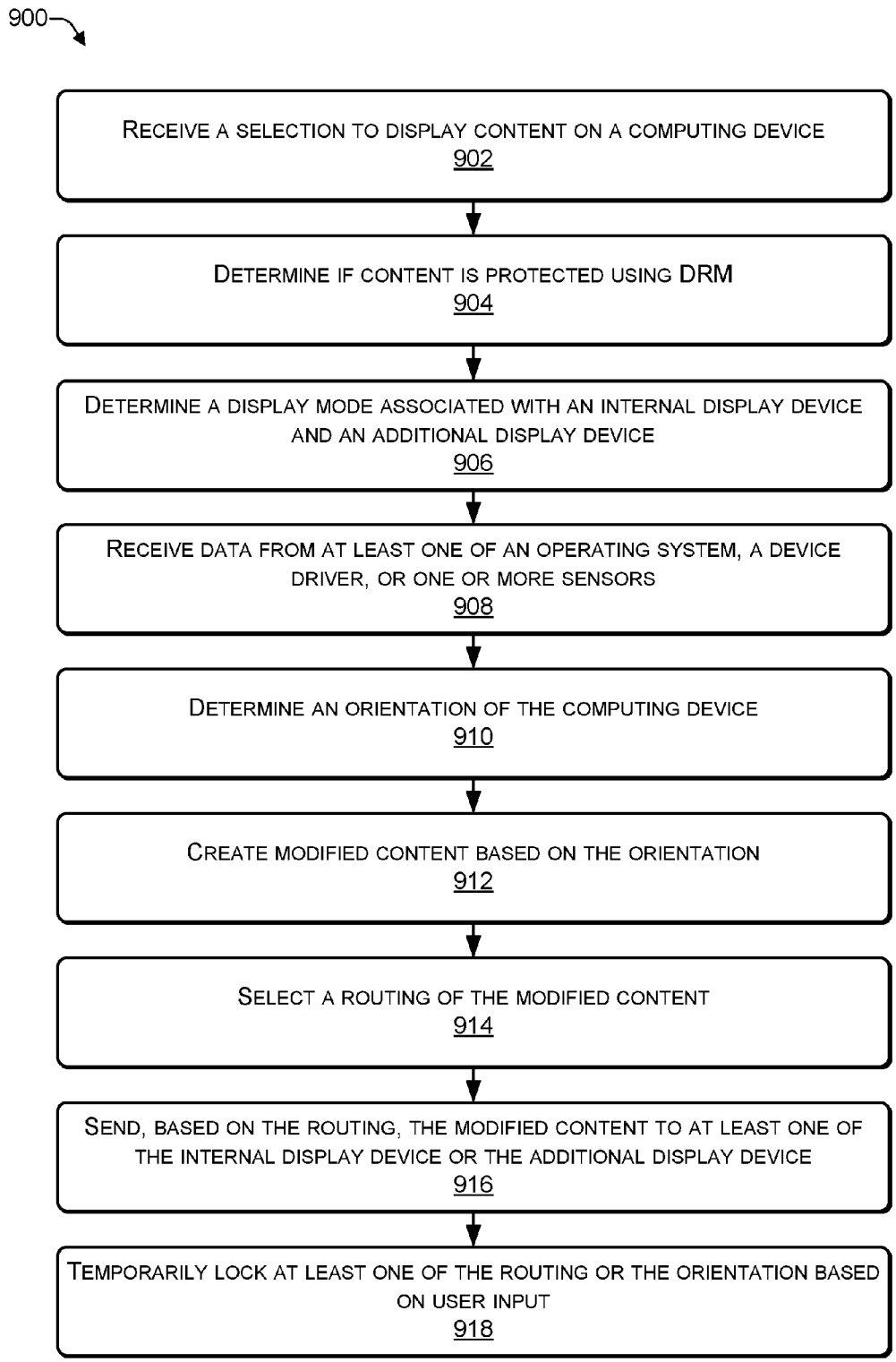
FIG. 9 is a flowchart of a process that includes determining whether video content is protected with a digital rights management (DRM) scheme according to some embodiments.

In the flow diagrams of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to FIG. 1, 2, 3, 4, 5, 6, or 7 as described above, although other models, frameworks, systems and environments may be used to implement these processes.

FIG. 8 is a flowchart of a process 800 that includes determining a display mode according to some embodiments. The process 800 may be performed by a component of the computing device 102, such as, for example, the controller 126 of FIG. 1.

At 802, a display mode associated with the operating system may be determined. For example, in FIG. 1, the controller 126 may determine the display mode 144 associated with the OS 132. In some cases, the display mode 144 may be one of (a) an extended display mode (e.g., unprotected content may be displayed across both of the display devices 124(1) and 124(2)), (b) a single display mode (e.g., content is displayed on one display device while the other display device is off or blank), or (c) a clone mode (e.g., the same content is displayed on each of the display devices 124(1) and 124(2)).

At 804, a determination may be made as to whether content to be displayed includes digital rights management (DRM). For example, in FIG. 1, the controller 126 may determine that the first content 140(1) is DRM protected content and output the first content 140(1) from the eDP port 110. The controller 126 may determine that the second content 140(2) is unprotected content and output the second content 140(2) from the DP port 112. Based on the three possible display modes (determined at 802) and whether or not the content includes DRM (determined at 804), there are six possibilities, described in 806, 810, 814, 818, 822, and 826.

At 806, if extended desktop mode has been enabled and the content includes DRM protection, then at 808 the content is output from the eDP port and sent to one of the two display devices and additional content is sent from the DP port output to the other of the two display devices. For example, in FIG. 1, in extended desktop mode, if the first content 140(1) includes DRM, the first content 140(1) may be sent from the eDP port 110 to either the internal display device 124(1) or the additional display device 124(2) depending on an orientation of the computing device 102. The output of the DP port 112 may be sent to whichever display device is not being sent the signal from the eDP port 110. To illustrate, in extended desktop mode, if the computing device 102 is in the horizontal orientation 204 of FIG. 2 and the internal display device 124(1) is facing the user, the output of the eDP port 110 may be routed to the internal display device 124(1) and the output of the DP port 112 may be routed to the additional display device 124(2). In the extended display mode, unprotected content, such as Windows® desktop, may be displayed stretched across both of the displays 124(1) and 124(2) (e.g., similar to the first content 502 in FIG. 7). A first portion of the unprotected content may be output from the eDP port 110 and a second (remaining) portion of the unprotected content may be output from the DP port 112. The process may then proceed to 830.

At 810, if clone mode has been enabled and the content includes DRM protection, then at 812 the eDP port output is sent to both of the two display devices (the DP port output is not used). For example, in FIG. 1, in clone mode, if the first content 140(1) includes DRM, the first content 140(1) may be sent from the eDP port 110 to both the internal display device 124(1) and to the additional display device 124(2). The process may then proceed to 830.

At 814, if single display mode has been enabled and the content includes DRM protection, then at 816 the eDP port output is sent to one of the two display devices (the DP port output is not used) and the other display is blank or off. For example, in FIG. 1, in single display mode, if the first content 140(1) includes DRM, the first content 140(1) may be sent from the eDP port 110 to either the internal display device 124(1) or the additional display device 124(2) depending on an orientation of the computing device 102 (e.g., depending on which display is viewable by the user). To illustrate, assume the computing device 102 is in the horizontal orientation 204 of FIG. 2. If the internal display device 124(1) is facing the user, then the output of the eDP port 110 may be routed to the internal display device 124(1). If the additional display device 124(2) is facing the user, then the output of the eDP port 110 may be routed to the additional display device 124(2). The process may then proceed to 830.

At 818, if extended desktop mode has been enabled and the content does not include DRM protection, then at 820 the eDP port output is sent to one of the two display devices and the DP port output is sent to the other of the two display devices. For example, in FIG. 1, in extended desktop mode, the first content 140(1) of the eDP port 110 may be sent to either the internal display device 124(1) or the additional display device 124(2) depending on an orientation of the computing device 102. The output of the DP port 112 may be sent to whichever display device is not being sent the signal from the eDP port 110. To illustrate, in extended desktop mode, if the computing device 102 is in the horizontal orientation 204 of FIG. 2 and the internal display device 124(1) is facing the user, the output of the eDP port 110 may be routed to the internal display device 124(1) and the output of the DP port 112 may be routed to the additional display device 124(2). If the first content 140(1) is unprotected and being displayed stretched across both of the display devices 124(1) and 124(2), a portion of the first content 140(1) may be output from the eDP port 110 to one of the display devices 124(1) or 124(2) and a remaining portion of the first content 140(1) may be output from the DP port 112 to the other of the display devices 124(2) or 124(1). The process may then proceed to 830.

At 822, if single display mode has been enabled and the content does not include DRM protection, then at 824 the eDP port output is sent to one of the two display devices. For example, in FIG. 1, in extended desktop mode, the first content 140(1) may be sent from the eDP port 110 to either the internal display device 124(1) or the additional display device 124(2) depending on an orientation of the computing device 102. The output of the DP port 112 is not used. To illustrate, in single display mode, if the computing device 102 is in the horizontal orientation 204 of FIG. 2 and the internal display device 124(1) is facing the user, the output of the eDP port 110 may be routed to the internal display device 124(1).

At 826, if clone mode has been enabled and the content is unprotected (e.g. does not include DRM protection), then at 828 the content is output from the eDP port and sent to both display devices. For example, in FIG. 1, in clone mode, unprotected content may be sent from the eDP port 110 to both the internal display device 124(1) and the additional display device 124(2). The process may then proceed to 830.

At 830, an orientation of the computing device may be determined. For example, in FIG. 1, the controller 126 may determine an orientation of the computing device 102 based on one or more of the data 136(1) to 136(N). To illustrate, the controller 126 may determine whether the computing device 102 is in the vertical orientation 202 or the horizontal orientation 204 of FIG. 2. If the computing device 102 is in the vertical orientation 202, the controller 126 may determine whether the computing device 102 is in the book orientation 302 or the vertical tablet orientation 304 of FIG. 3. In the vertical orientation 202, the controller 126 may determine whether the internal computing device 124(1) is on the left or on the right. Determining whether the internal display device 124(1) is on the left or on the right also determines whether the additional display device 124(2) is on the right or on the left. If the computing device 102 is in the horizontal orientation 204, the controller 126 may determine whether the computing device 102 is in the tent orientation 402, the presentation orientation 404, the horizontal tablet orientation 406, or the clamshell orientation 408 and may determine whether the internal computing device 124(1) is on the top or on the bottom. Determining whether the internal display device 124(1) is on the top or on the bottom also determines whether the additional display device 124(2) is on the bottom or on the top. Determining the orientation of the computing device 102 may also include taking into account the user input 142. For example, a user may provide the user input 142 to override the orientation determined by the controller 126. In some cases, the user input 142 may lock the orientation, the routing, or both such that the controller 126 ignores the data 136 provided by one or more of the device driver 130, the OS 132, and the sensors 134. The user may provide additional user input to remove the lock such that the controller 126 resumes determining the orientation of the computing device 102 based on the data 136 provided by one or more of the device driver 130, the OS 132, and the sensors 134.

At 832, based on (i) the display mode, (ii) whether the content includes DRM protection, and (iii) the orientation of the computing device, the controller 126 may select one of the four routings (e.g., normal, swap, eDP only, or DP only). For example, in FIG. 1, the normal routing sends the output of the eDP port 110 to the internal display device 124(1) and sends the output of the DP port 112 to the additional display device 124(2). The swap routing sends the output of the DP port 112 to the internal display device 124(1) and sends the output of the eDP port 110 to the additional display device 124(2). The eDP only routing sends the output of the eDP port 110 to both of the display devices 124(1) and 124(2). The DP only routing sends the output of the DP port 112 to both of the display devices 124(1) and 124(2).

At 834, the output from at least one of the eDP port or the DP port may be modified. For example, in FIG. 1, depending on the orientation of the computing device 102 and the user input 142, one or both of the first content 140(1) or the second content 140(2) may be modified by rotating each of the first content 140(1), the second content 140(2), or both between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). In some cases, a first modification may be applied to the first content 140(1) and a second modification may be applied to the second content 140(2). The first modification may be the same as the second modification or the first modification may be different from the second modification. For example, the first content 140(1) may be rotated approximately 90 degrees and the second content 140(2) may be rotated approximately 270 degrees.

At 836, the modified content may be output based on the routing. For example, in FIG. 1, the controller 126 may select one of the four routings (e.g., normal, swap, eDP only, or DP only), modify one or both of the content 140(1) or 140(2), and route one or both of the modified content to one or both of the display devices 124(1) or 124(2) based on the selected routing.

Thus, a controller may determine a display mode of an operating system, may determine if content being played back includes DRM protection, and may determine an orientation of a computing device having two display devices. Based on the display mode, the orientation, and whether the content includes DRM protection, the controller may select a routing from one of multiple routings associated with a crossbar switch. The controller may modify content being sent from an eDP port, a DP port, or both to create modified content. The modified content may be routed by the crossbar switch to one or both of the display devices according to the selected routing. In some cases, a user may provide user input to temporarily keep (e.g., temporarily lock-in) a particular orientation, a particular routing, or both. While the orientation and/or routing is temporarily locked, the controller may ignore the data provided by the OS, device driver, and sensors. When the user provides additional user input to remove the lock, the controller may resume determining an orientation and selecting a routing of the crossbar switch based on the data provided by the OS, device driver, and sensors.

FIG. 9 is a flowchart of a process 900 that includes determining whether video content is protected with a digital rights management (DRM) scheme according to some embodiments. The process 900 may be performed by one or more components of the computing device 102 of FIG. 1, such as for example, the controller 126.

At 902, a selection to display content (e.g., video content) may be received. For example, in FIG. 1, the computer device 102 may receive a selection from a user to display one or more of the first content 140(1) or the second content 140(2).

At 904, a determination may be made whether the content is protected using digital rights management (DRM), such as HDCP. For example, in FIG. 1, the controller 126 may determine whether the content 140(1) is protected using a DRM scheme (e.g., HDCP) and whether the content 140(2) is protected using a DRM scheme.

At 906, a determination may be made as to a display mode associated with an internal display device and an additional display device. For example, in FIG. 1, the controller 126 may determine whether the mode 144 is (1) a clone mode in which the additional display device 124(2) is configured to clone (e.g., duplicate) content being displayed on the internal display device 124(1) (e.g., FIG. 5), (2) a single display mode in which one of the display devices 124(1) or 124(2) is blank (or off) while the other of the display devices 124(1) or 124(2) displays content (e.g., FIG. 6), or (3) an extended display mode in which the additional display device 124(2) is configured as an extension of the internal display device 124(1) to enable unprotected content to be displayed across both of the display devices 124(1) and 124(2) (e.g., FIG. 5).

At 908, data from at least one of an operating system, a device driver, or one or more sensors may be received. For example, in FIG. 1, the controller 126 may receive the data 136 from one or more of the device driver 130, the operating system 132, and the sensors 134.

At 910, an orientation of the computing device may be determined. For example, the controller 126 may determine an orientation of the computing device 102 based on the data 136. In some cases, the controller 126 may determine an orientation of at least one of the internal display devices 124(1) or the additional display device 124(2) based on the data 136. For example, the controller 126 may determine whether the computing device 102 is in the vertical configuration 202 or the horizontal configuration 204 of FIG. 2. The controller 126 may determine whether the internal display device 124(1) is in the left position (e.g., left location) or right position (e.g., right location) when the computing device 102 is in the vertical orientation 202. The controller 126 may determine whether the internal display device 124(1) is at the top position or the bottom position when the computing device 102 is in the horizontal orientation 204.

At 912, the content may be modified (e.g., based at least in part on the orientation) to create modified video content. For example, in FIG. 1, the controller 126 may modify at least one of the first content 140(1) or the second content 140(2) based on the orientation of the computing device 102. For example, at least one of the first content 140(1) or the second content 140(2) may be rotated between approximately zero degrees and approximately two hundred and seventy degrees.

At 914, a routing of the modified content (and any additional content to be displayed) may be determined. For example, the modified content may be routed to one or both of the internal display device 124(1) and the additional display device 124(2). The controller 126 may determine the routing based on (1) an orientation of the computing device 102, (2) whether protected content is being displayed, and (3) the display mode associated with the display devices 124(1) and 124(2).

At 916, the modified content (and any additional content) may be sent to at least one of the internal display device or the additional display device based on the routing. For example, in FIG. 1, the controller 126 may select a routing from one of four routings associated with the crossbar switch 114. In a normal routing, the crossbar switch 114 may route the first content 140(1) from the eDP port 110 to the output 116(1) for display on the internal display device 124(1) and may route the second content 140(2) from the DP port 112 to the output 116(2) for display on the additional display device 124(2). In a swap routing, the crossbar switch 114 may route the first content 140(1) from the eDP port 110 to the output 116(2) for display on the additional display device 124(2) and may route the second content 140(2) from the DP port 112 to the output 116(1) for display on the internal display device 124(2). In an eDP only routing, the crossbar switch 114 may route the first content 140(1) from the eDP port 110 to both the output 116(1) and 116(2) for display on the internal display device 124(1) and the additional display device 124(2). In a DP only routing, the crossbar switch 114 may route the second content 140(2) from the DP port 112 to both the output 116(1) and the output 116(2) for display on the internal display device 124(1) and the additional display device 124(2).

At 918, at least one of the routing or the orientation may be temporarily locked based on user input. For example, in FIG. 1, the user input 142 may cause the controller 126 to lock a current orientation and a current routing and temporarily disregard the data 136. At a later point in time, the user may provide additional user input to remove the lock, after which the controller 126 may determine a current orientation of the computing device 102 based on the current data 136. Based on the current orientation, the controller 126 may determine a new routing and instruct the crossbar switch 114 to use the new routing. Based on the current orientation, the controller 126 may rotate either or both of the content 140(1) and 140(2).

Figure 10:
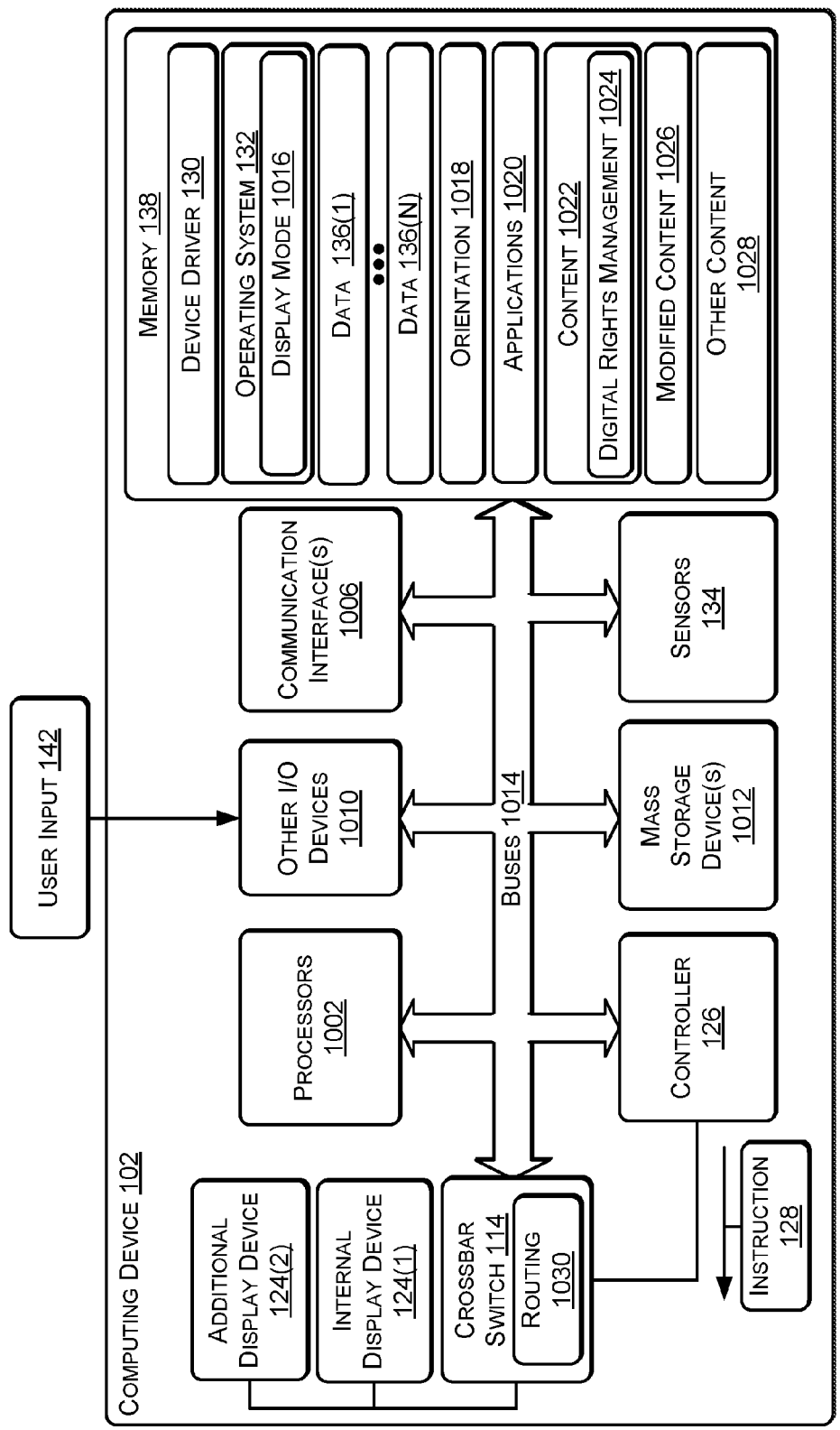
FIG. 10 illustrates an example configuration of a computing device that can be used to implement the systems and techniques described herein.

FIG. 10 illustrates an example configuration of the computing device 102 of FIG. 1 that can be used to implement the systems and techniques described herein. The computing device 102 may include one or more processors 1002 (e.g., the CPU 106 and the GPU 104 of FIG. 1), the memory 138, communication interfaces 1006, the display devices 124(1) and 124(2), other input/output (I/O) devices 1010, and one or more mass storage devices 1012, configured to communicate with each other, such as via one or more system buses 1014 or other suitable connection. While a single bus is illustrated for ease of understanding, it should be understood that the system buses 1014 may include multiple buses, such as memory device buses, storage device buses, power buses, video signal buses, and the like.

The processors 1002 are one or more hardware devices that may include a single processing unit or a number of processing units, all of which may include single or multiple computing units or multiple cores. The processors 1002 may include an integrated GPU or the GPU a separate processor device. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 138, mass storage devices 1012, or other computer-readable media.

Memory 138 and mass storage devices 1012 are examples of non-transitory computer media (e.g., memory storage devices) for storing instructions that can be executed by the processors 1002 to perform the various functions described herein. For example, memory 138 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 138 and mass storage devices 1012 may be collectively referred to as memory or computer storage media herein, and may be a media capable of storing computer-readable, processor-executable program instructions as computer program code that can be executed by the processor 1002 as a particular machine configured for carrying out the operations and functions described in the implementations herein.

The computing device 102 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 124(1) and 124(2) may be connected to each other using a hinge (e.g., the hinge 206 of FIG. 2) that enables each display device to rotate relative to the other display device. The display devices 124 may be used for displaying information and images to users. Other I/O devices 1010 may be devices that receive various inputs from a user and provide various outputs to the user, and may include a keyboard, a remote controller, a mouse, a printer, audio input/output devices, and so forth.

The computer storage media, such as memory 138 and mass storage devices 1012, may be used to store software and data. For example, the computer storage media may be used to store the operating system 132, the device driver 130, and the data 136(1) to 136(N). The operating system 132 may be set to a particular display mode 1016. For example, the operating system 132 may have a default display mode and a user may set the display mode 1016 to something different than the default display mode. The display mode 1016 may be one of (1) an extended display mode (e.g., see FIG. 7), (2) a single display mode (e.g., see FIG. 6), or (3) a clone mode (e.g., see FIG. 5). The computer storage media may store an orientation 1018, one or more software applications 1020, content 1022, modified content 1026, and other content 1028. The controller 126 may determine the orientation 1018 of the computing device 102 based on the data 136(1) to 136(N) provided by one or more of the operating system 132, the device driver 130, or the sensors 134. The software applications 1020 (e.g., the content 140(1) or 140(2) of FIG. 1) may include a word processing application, a spreadsheet application, and the like. The content 1022 may be audio content, video content, streaming content, or another type of content. In some cases, the content 1022 may include DRM 1024 while in other cases the content 1022 may be unprotected (e.g., no DRM protection). The modified content 1026 may be created by rotating the content 1022 between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). The amount of rotation may be based on the orientation 1028 of the computing device 102.

The controller 126 may determine the display mode 1016 of the OS 132, may determine if the content 1022 to be displayed includes DRM 1024, and may determine the orientation 1018 of the computing device 102 having the two display devices 124(1) and 124(2). Based on the display mode 1016, the orientation 1018, and whether the content 1022 includes the DRM 1024, the controller 126 may select a routing 1030 from one of the multiple routings (e.g., normal, swap, eDP only, or DP only) associated with the crossbar switch 114. The controller 126 may modify the content 1022 to create the modified content 1026. The modified content 1026 may be routed by the crossbar switch 114 to one or both of the display devices 124(1) and 124(2) according to the selected routing 1030. In some cases, a user may provide user input to temporarily keep (e.g., temporarily lock-in) a particular orientation, a particular routing, or both. While the orientation and/or routing is temporarily locked, the controller may ignore the data provided by the OS, device driver, and sensors. When the user provides additional user input to remove the lock, the controller may resume determining an orientation and selecting a new routing of the crossbar switch 114 based on the data 136 provided by one or more of the OS 132, the device driver 130, and the sensors 134.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by a computing device comprising a first display device and a second display device, that protected content is to be displayed on the computing device;
    determining, by the computing device, that a display mode of the computing device comprises an extended display mode wherein the second display device is configured as an extension of the first display device;
    determining, by the computing device, an orientation of the computing device;
    determining, by the computing device, a routing based at least in part on the orientation of the computing device;
    instructing, by the computing device, a crossbar switch to select the routing from a plurality of routings; and
    sending, by the computing device, the protected content in an unencrypted format to either the first display device or to the second display device based at least in part on the routing.

2. The method of claim 1, further comprising:
    receiving a second selection to display second content;
    determining that the display mode has been changed from the extended display mode to a clone mode wherein the second display device is configured as a clone of the first display device;
    determining a second orientation of the first display device;
    modifying the second content based at least in part on the second orientation to create second modified content;
    determining a second routing of the second modified content; and
    sending, based on the second routing, the second modified content in the unencrypted format to both the first display device and the second display device.

3. The method of claim 1, further comprising:
    receiving a third selection to display third content;
    determining that the display mode comprises a single display mode wherein one of the first display device or the second display device is used;
    determining a third orientation of the computing device;
    modifying the third content based at least in part on the third orientation to create third modified content;
    determining, based at least in part on the third orientation, a third routing of the third modified content; and
    sending, based on the third routing, the third modified content in the unencrypted format to one of the first display device or the second display device.

4. The method of claim 1, further comprising:
    displaying unprotected content across both the first display device and the second display device by:
        sending a portion of the unprotected content from an embedded DisplayPort port of the computing device; and
        sending a remaining portion of the unprotected content from a DisplayPort port of the computing device.

5. The method of claim 1, further comprising:
    displaying unprotected content across both the first display device and the second display device.

6. The method of claim 1, wherein sending the protected content in the unencrypted format to either the first display device or to the second display device based at least in part on the routing comprises:
    modifying the protected content based at least in part on the orientation of the computing device to create modified content; and
    sending the modified content in the unencrypted format to either the first display device or to the second display device.

7. The method of claim 1, wherein:
    a DisplayPort (DP) port of the computing device outputs a portion of unprotected content; and
    an embedded DisplayPort (eDP) of the computing device outputs:
        a remaining portion of the unprotected content; and
        the protected content in the unencrypted format.

8. A computing device comprising:
    a first display device;
    a second display device;
    a crossbar switch;
    one or more processors;
    one or more non-transitory computer readable media storing instructions executable by the one or more processors to perform operations comprising:
        receiving a selection to display protected content;
        determining that a display mode of the computing device comprises an extended display mode wherein the second display device is configured as an extension of the first display device;
        determining an orientation of the computing device;
        determining a routing of the protected content based at least in part on the orientation of the computing device, wherein the routing is one of a plurality of routings associated with the crossbar switch; and
        sending, based at least in part on the routing, the protected content in an unencrypted format to either the first display device or the second display device.

9. The computing device of claim 8, wherein the orientation of the first display device comprises one of a book orientation, a vertical tablet orientation, a tent orientation, a presentation orientation, a horizontal tablet orientation, or a clamshell orientation.

10. The computing device of claim 8, wherein the operations further comprise:
   determining a location of the first display device relative to the second display device, wherein the location comprises one of a left location, a right location, a top location, or a bottom location.

11. The computing device of claim 8, further comprising:
   displaying unprotected content across both the first display device and the second display device by:
      sending a portion of the unprotected content from an embedded DisplayPort port of the computing device; and
      sending a remaining portion of the unprotected content from a DisplayPort port of the computing device.

12. The computing device of claim 8, wherein the operations further comprise:
   receiving data from at least one of an accelerometer, a gyroscope, a magnetometer, a magnetic compass, a proximity sensor, a camera, an operating system, or a device driver of the computing device; and
   determining the orientation of the computing device based at least in part on the data.

13. The computing device of claim 8, further comprising:
   a DisplayPort (DP) port to output at least a portion of unprotected content; and
   an embedded DisplayPort (eDP) port to output:
      the protected content in the unencrypted format; and
      a remaining portion of the unprotected content.

14. One or more non-transitory computer-readable media storing instructions that are executable by one or more processors to perform operations comprising:
   receiving a selection to play protected content on a computing device comprising a first display device and a second display device;
   determining that a display mode of the computing device comprises an extended display mode wherein the second display device is configured as an extension of the first display device;
   determining an orientation of the computing device;
   determining a routing of the protected content based at least in part on the orientation;
   selecting the routing from a plurality of routings associated with a crossbar switch; and
   sending, based on the routing, the protected content in an unencrypted format to either the first display device or the second display device.

15. The one or more non-transitory computer-readable media of claim 14, wherein:
   a DisplayPort (DP) port of the computing device outputs a portion of unprotected content; and
   an embedded DisplayPort (eDP) of the computing device outputs:
      a remaining portion of the unprotected content; and
      the protected content in the unencrypted format.

16. The one or more non-transitory computer-readable media of claim 14, wherein the operations further comprise:
   modifying the protected content based at least in part on the orientation of the computing device to create modified content; and
   sending the modified content in the unencrypted format to either the first display device or the second display device.

17. The one or more non-transitory computer-readable media of claim 16, wherein modifying the protected content comprises rotating, based at least in part on the orientation of the computing device, the protected content between approximately zero degrees and approximately two hundred and seventy degrees.

18. The one or more non-transitory computer-readable media of claim 14, the operations further comprising:
   receiving first user input; and
   locking at least one of the routing or the orientation based on the first user input.

19. The one or more non-transitory computer-readable media of claim 18, the operations further comprising:
   receiving second user input; and
   unlocking the routing and the orientation based on the second user input.

20. The one or more non-transitory computer-readable media of claim 14, the operations further comprising:
   displaying unprotected content across both the first display device and the second display device.

* * * * *